Jan. 20, 1931.　　　G. A. DE VLIEG　　　1,789,544
METHOD OF AND MACHINE FOR GRINDING
Filed April 28, 1928　　5 Sheets-Sheet 1

INVENTOR
Gerard A. DeVlieg
BY
ATTORNEYS

Jan. 20, 1931. G. A. DE VLIEG 1,789,544
METHOD OF AND MACHINE FOR GRINDING
Filed April 28, 1928 5 Sheets-Sheet 4
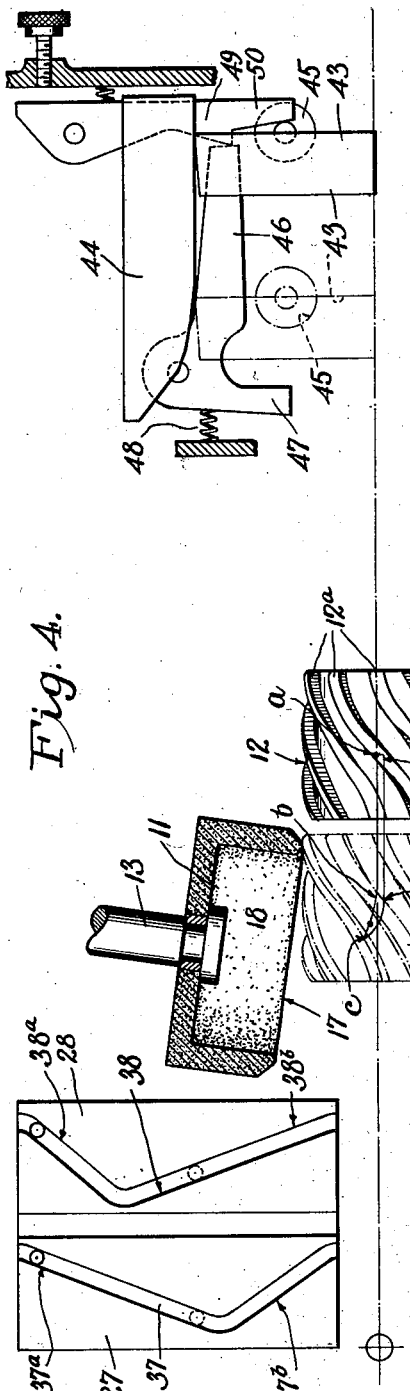
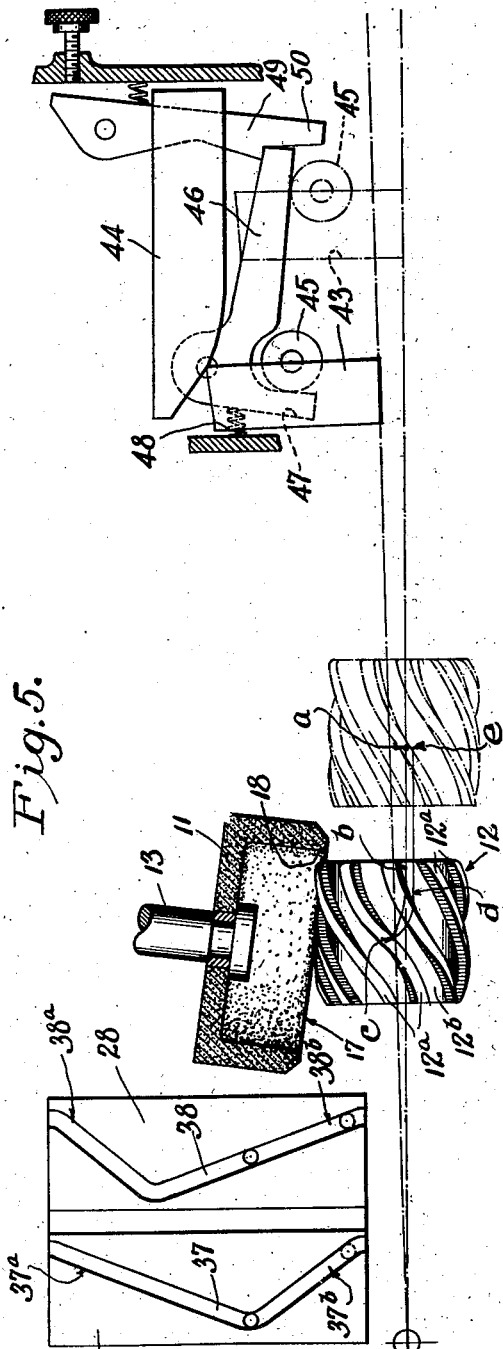
Fig. 4.
Fig. 5.
INVENTOR
Gerard A. DeVlieg
BY
Chindahl Parker v Carlson
ATTORNEYS

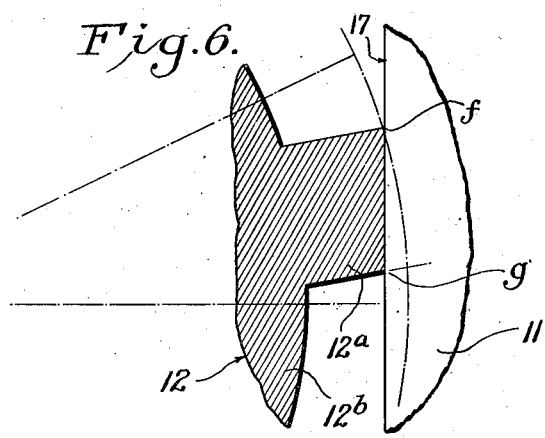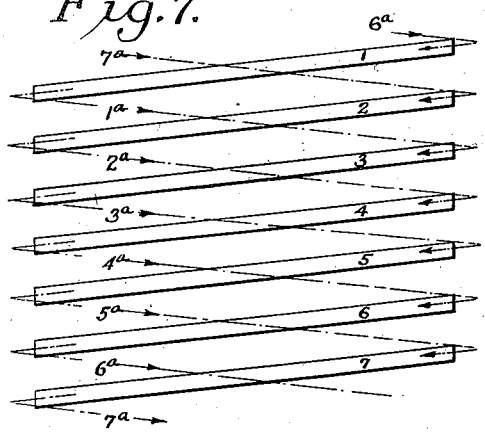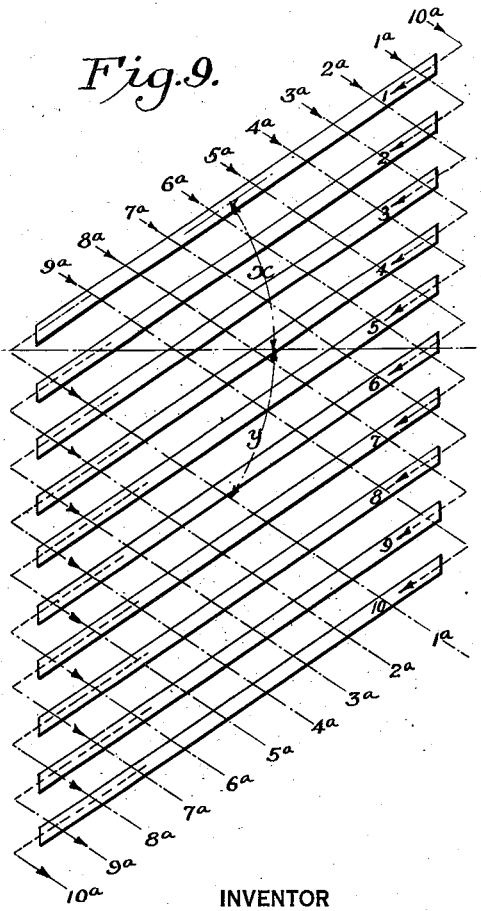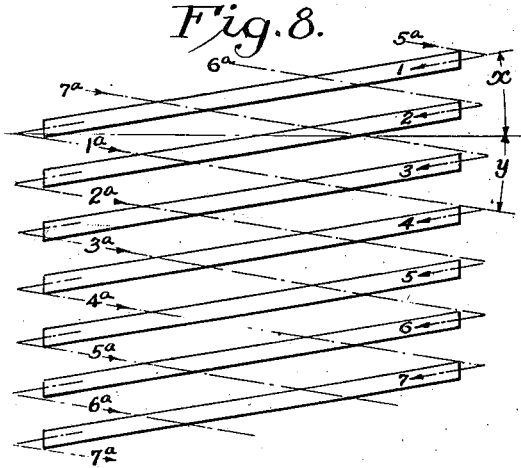

Patented Jan. 20, 1931

1,789,544

UNITED STATES PATENT OFFICE

GERARD A. DE VLIEG, OF ROCKFORD, ILLINOIS

METHOD OF AND MACHINE FOR GRINDING

Application filed April 28, 1928. Serial No. 273,696.

The present invention relates to improvements in the art of grinding, and particularly to a new and improved method of and machine for grinding tools, such as rotary cutters and reamers.

The present invention has special reference to a method and machine for grinding, such as is disclosed in my Patent No. 1,710,533, dated April 23, 1929, in which a cutter having a plurality of longitudinally inclined and peripherally spaced cutting blades is presented to a grinding element, and is axially reciprocated relatively to the grinding element and rotated in timed relation to the reciprocation so as to compensate for the inclination of the blades, and to present the consecutive blades successively to the grinding element in consecutive reciprocations. To permit indexing, each reciprocation comprises a cutting stroke in which the cutter and the grinding element are in operative relation, and a free return stroke in which the cutter and the grinding element are in spaced relation. During the free return stroke, the rotation of the cutter serves to move the next or successive blade into position for engagement with the grinding element on the succeeding cutting stroke.

In the foregoing method, in which the cutter is rotatable continuously in one direction, the opposite ends of the adjacent blades must not overlap peripherally, i. e., the back end of each blade must not be in advance of the lead end of the next adjacent blade. If the opposite ends of the adjacent blades are in alinement longitudinally of the cutter, the latter should not be rotated during the free return stroke. Preferably, the lead end of each blade is in advance of the back end of the preceding blade, and in such instance the rotation of the cutter, although it may be varied, is uninterrupted. However, it is often desirable or necessary to have the opposite ends of the adjacent blades peripherally in overlapping relation, as for example where the cutter is of considerable length or where the blades are inclined at a relatively large angle to the axis of the cutter, and in these instances the foregoing method would not be applicable.

The primary object of the present invention therefore resides in the provision of a novel method of grinding cutters having longitudinally inclined or helical cutting elements, in which the cutter is rotated continuously in one direction and in which spaced and not consecutive cutting elements are ground in successive cutting engagements with the grinding element.

Another object resides in the provision of a novel method of grinding cutters having longitudinally inclined or helical cutting elements with the opposite ends of the adjacent cutting elements in over-lapping relation peripherally of the cutter, in which the cutter is rotated continuously in one direction to compensate for the angle of the elements during grinding engagement and to index the elements for successive engagements.

A further object resides in the provision of a new and improved method of grinding cutters having a plurality of peripherally spaced and helical cutting edges in which one or more edges are skipped in indexing from one edge to another.

Still another object resides in the provision of a novel method of grinding cutters having a plurality of peripherally spaced and helical cutting edges in which the cutter is rotated continuously in one direction to compensate for the helix angle and to index the edges, one or more edges being skipped in each indexing movement and the number of total edges and the number of edges skipped in each indexing movement being such that each edge is ground.

A further object is to provide a new and improved machine for carrying out the foregoing method.

A general object is to provide a method which is simple, accurate, expeditious and available for a large variety of cutters regardless of the length or inclination of the cutting edges, and a machine for carrying out the method which is simple and inexpensive in construction, and efficient in operation.

Further objects and advantages will become apparent as the description proceeds.

In the accompanying drawings, Figure 1 is a fragmentary front elevation, partially in section, of a grinding machine for carrying out the method embodying the features of my invention.

Figs. 4 and 5 are diagrammatic views illustrating different stages in one cycle of the grinding operation for a left hand cutter.

Fig. 6 is a diagrammatic view illustrating the degree of relief on each of the cutter blades resulting from the grinding operation.

Figure 1:
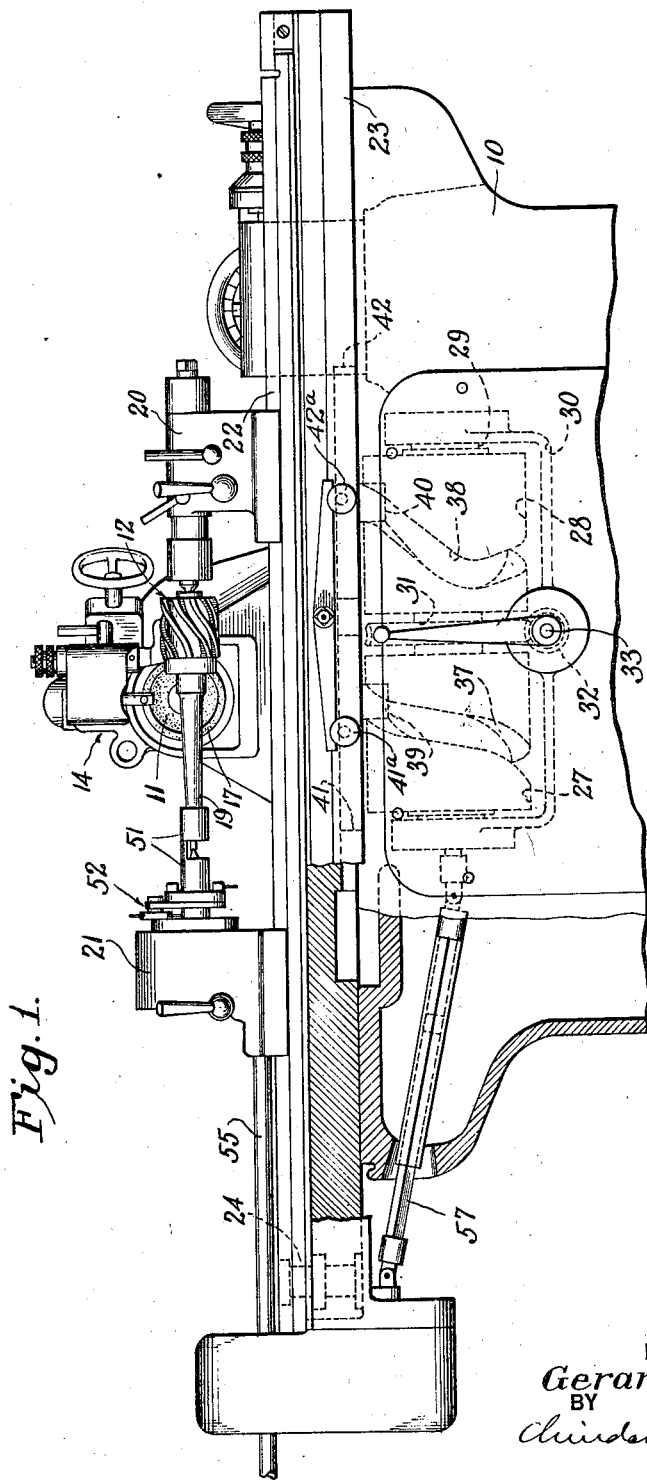

Figs. 7, 8, and 9 respectively are diagrams illustrating the number of edges that may be skipped in the indexing of cutters having different numbers of edges, and different helix angles.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 2:
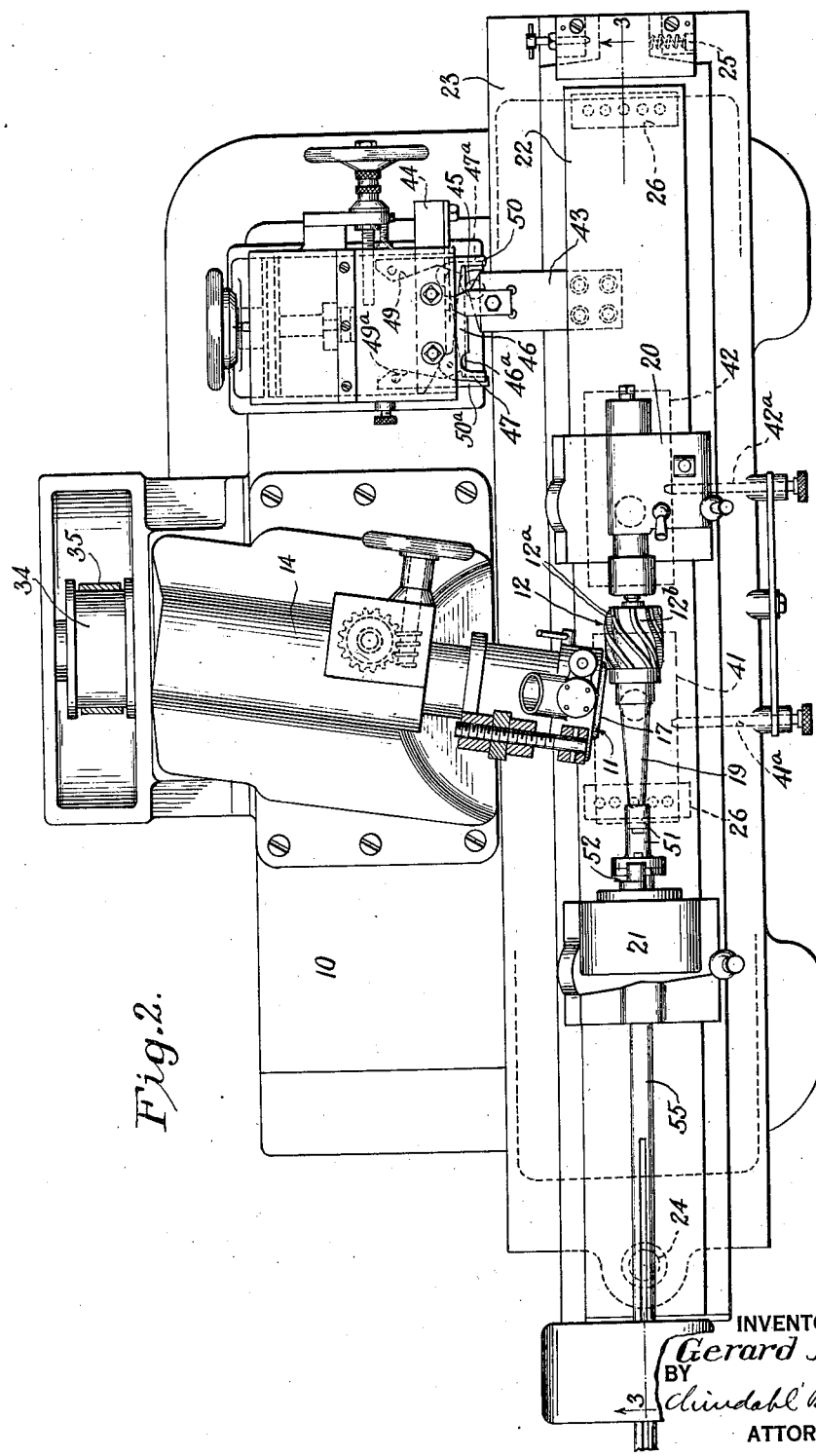
Fig. 2 is a plan view.
Figure 3:
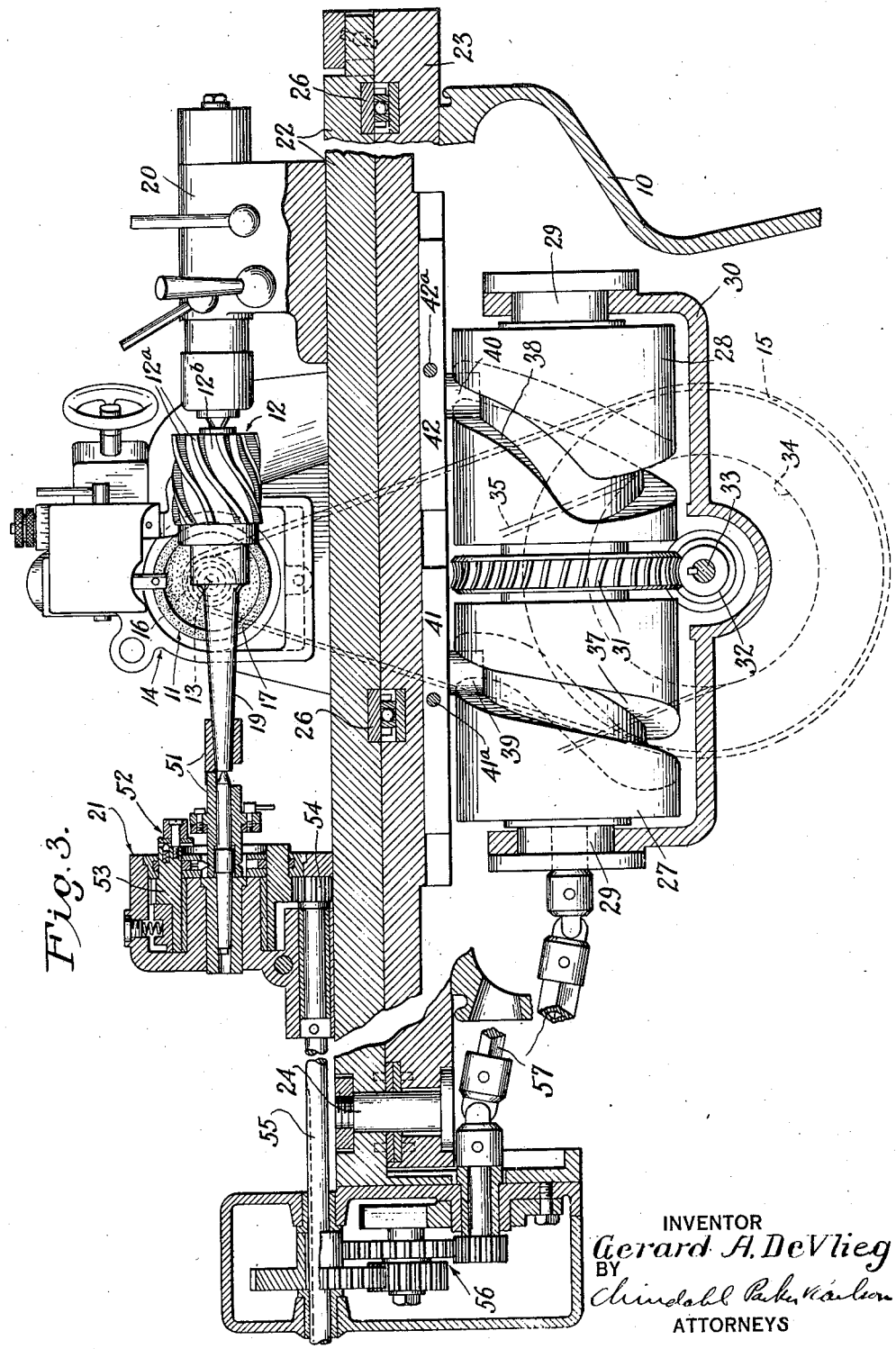
Fig. 3 is a longitudinal sectional view taken along line 3—3 of Fig. 2.

The method may be carried out on any suitable form of grinding machine, and in the present instance, I have illustrated in Figs. 1, 2, and 3 a suitable machine which is generally similar to the machine disclosed in said copending application.

Referring more specifically to the drawings, the machine comprises a suitable bed or base 10 for operatively supporting a grinding wheel 11 and a cutter 12 to be ground.

The grinding wheel 11 is mounted on one end of a spindle 13 which is suitably journaled in a standard 14 mounted on the rear side of the base 10, and which is adapted to be driven by any suitable means, such as a belt 15 engaging a pulley 16 thereon and leading to a suitable source of power. Preferably the grinding wheel 11 is cup-shaped in form. The annular end surface of the grinding wheel 11 constitutes a grinding face 17, and preferably the inner peripheral edge of the face is rounded as indicated at 18 in Figs. 4 and 5. To provide clearance between one side of the grinding wheel 11 and the cutter 12, the standard 14 and the spindle 13 are horizontally inclined with respect to a transverse plane through the base.

While the cutters to be ground may have a wide variety of forms, for example straight or helical blades, blades that are removable from or are integral with the body of the cutter, and blades that are or are not in overlapping relation peripherally of the cutter, I have shown the cutter 12 as having overlapping, helical blades 12$^a$ integral with the body 12$^b$, and adapted to be relief ground.

The cutter 12 is adapted to be mounted on a suitable arbor 19 rotatably disposed between a tail stock 20 and a head stock 21. These stocks are mounted for adjustment on a table 22 pivotally mounted on a carriage 23 mounted on the base 10 for movement longitudinally thereof. Preferably, the table 22 is pivoted to the carriage 23 at one end by means of a pivot stud 24, and the other end of the table is spring pressed rearwardly by means of a suitable spring 25. To facilitate the pivotal movement of the table 22 on the carriage 23, suitable bearing tables 26 are interposed at spaced points between the two.

Any suitable means may be provided for reciprocating the carriage 23 on the base 10 and for controlling the rate of movement throughout the reciprocation. Preferably, two generally similar rotary cams 27 and 28 are provided. These cams are mounted in axial alignment on a shaft 29 journaled in a bracket 30 within the base 10. The shaft 29 is connected through a worm wheel 31, disposed between the cams 27 and 28, and a worm 32 in mesh with the wheel 31 to a drive shaft 33. Secured to the shaft 33 is a pulley 34 which may be connected through a belt 35 to any suitable source of power (not shown).

The cam members 27 and 28 are formed respectively with peripheral cam grooves 37 and 38. These grooves may have any suitable form, and in the present instance comprise sections 37$^a$ and 37$^b$ and 38$^a$ and 38$^b$. The relative lengths of these sections determine the relative speeds of movement of the carriage 23 in opposite directions. The sections 37$^b$ and 38$^b$ may be the same in length as the sections 37$^a$ and 38$^a$, or may be shorter, as shown in Figs. 4 and 5, to effect a quick return. The grooves 37 and 38 respectively engage rollers 39 and 40 mounted on the underside of slides 41 and 42 adapted to be secured selectively to the carriage 23 by means of locking pins 41$^a$ and 42$^a$ respectively. It will be evident that the cams 27 and 28 are adapted to reciprocate the carriage 23 oppositely fast in one direction and slow in the other direction.

Any suitable means may be provided for oscillating the table 22 on the carriage 23 so as to press the cutter 12 toward the grinding wheel 11 during one stroke and to separate the two during the other stroke of each to and fro reciprocation. In the present instance, this means comprises a cam follower 43 on the movable end of the table 22 adapted to ride on a cam 44 adjustably mounted on the base 10. The cam 44 is adapted to guide the cutter 12 in a straight line movement past the grinding face 17 with the two in cutting engagement.

Also mounted on the table 22 is a cam roller 45 adapted to ride on either of two pivotal cams 46 and 46ª for right and left hand cutters respectively. Since the cams 46 and 46ª and the trip means associated therewith are alike in construction but reversed in arrangement, one assembly will be specifically described and corresponding parts of the other assembly will be designated by the same reference characters distinguished by the letter $a$.

Formed on the pivoted end of the cam 46 is a laterally projecting dog or arm 47 adapted to be engaged by the roller 45 to move the free end of the cam forwardly away from the cam 44. A spring 48 engaging the arm 47 tends to move the cam rearwardly to release the arm 43 into engagement with the cam 44. The free end of a pivotally mounted pawl 49 is spring pressed against the free end of the cam 46 for holding the latter in forward position, and has an arm 50 adapted to be engaged by the cam roller 45 to release the cam 46.

Referring to Figs. 4 and 5, at the start of each cycle, the cam follower 43 is in engagement with the cam 44. Movement of the roller 39 along the groove section 37ª urges the carriage 23 to the left at a relatively slow speed in a cutting stroke controlled by the cam 44. In the present instance, the cam 44 defines a path for the cutter 12 along the straight line $a$—$b$ across the face 17 to grind the crown of each blade, and along a short curved line $b$—$c$ across the inner edge 18 into the wheel 11 to grind a deflection on the back end of each blade. At the end of the cutting stroke, the roller 45 moves the cam 46 forwardly into engagement with the pawl 49. Movement of the roller 39 along the groove section 37ᵇ urges the carriage 23 to the right in a free return stroke controlled by the cam 46. In the present instance, the cam 46 serves first to separate the cutter 12 and the wheel 11 along line $c$—$d$ and then to return the cutter along straight line $d$—$e$. At the end of the free return stroke, the roller 45 trips the pawl 49 to release the cam 46, thereby permitting a return of the cutter along line $e$—$a$ into the grinding stroke.

Means is provided for rotating the cutter 12 in one direction in timed relation to the reciprocation so as to compensate for the inclination of the blades during the cutting engagement and to index another blade into cutting position during the free return movement. Preferably, the arbor 19 is connected through interlocking dogs 51, a clearance setting mechanism 52, gear 53 and 54, a spline shaft 55, change speed gearing 56, and an extensible flexible shaft 57 to the shaft 29.

The teeth of the cutter 12 shown in the drawings overlap peripherally. The degree of overlap depends on the angle $x$ and the pitch of the blades, and the length of the cutter. While the invention is particularly intended for grinding cutters having overlapping blades, it is also advantageously adapted for the grinding of cutters that do not have overlapping blades, as for example where the opposite ends of the adjacent blades are spaced closely together peripherally of the cutter.

With the teeth of the cutter 12 in overlapping relation, it will be evident that the cutter 12 cannot be indexed from one blade directly to the next adjacent blade without skipping other blades. By properly correlating the speed of the carriage 23 and the speed of rotation of the cutter 12 in the free return stroke, a proper number of blades may be skipped in each indexing movement from one blade to another so that upon $n$—1 indexing movements, where $n$ equals the number of blades on the cutter, all of the blades will be ground. This applies to cutters with even numbered blades as well as to cutters with odd numbered blades.

It is possible to grind consecutive overlapping blades in successive cutting engagements with the grinding wheel 11 by skipping $n$ or $n$—2 blades in each indexing movement. Lesser numbers of blades may also be skipped. The different numbers of blades that may be skipped varies for cutters having different numbers of teeth. Without presuming to define a general formula of the number of blades that may be skipped, it may be stated that for cutters having a small number of even numbered blades, no odd number of blades can be skipped to grind all of the blades in a number of revolutions without resetting the cutter, but most even numbers of blades can be skipped, and that for cutters having a small number of odd numbered blades, $n$—1 blades, where $n$ equals the total number of blades, cannot be skipped to grind all of the blades in a number of revolutions without resetting the cutter, but most odd or even numbers of blades under $n$—1 can be skipped.

For a cutter having a given number of blades in the grinding of which a given number of blades are to be skipped in each indexing movement, the rotation of the cutter must be properly correlated to the reciprocation of the carriage 23 so as to compensate for the angle $x$ of the blades during each cutting engagement and so as to skip the desired number of blades during each free return movement. This may be accomplished through adjustment of the speed change gearing 56 and the provision of a proper cam 27 or 28. Preferably, the helix angle $x$ of the blades is equal to the angle $y$ of the free return movements. If the angles $x$ and $y$ are equal, and the speed of rotation of the cutter 12 is uniform, the free return stroke will be at the same speed as the cutting stroke, and the number of the blades skipped in each indexing movement will depend upon the angle and length of the blades.

In Figs. 7, 8, and 9, I have shown the development of three different cutters having 7, 7, and 10 blades respectively, arranged at different angles $x$.

In Fig. 7, one blade is skipped in each indexing movement. The line of grinding contact follows successively along blades 1, 3, 5, 7, 2, 4, and 6, and the path of the free return movements is successively along lines $1^a$, $3^a$, $5^a$, $7^a$, $2^a$, $4^a$, and $6^a$, to the starting point. After each blade has been ground, the cycle is repeated until the reamer is ground to the desired size.

In Fig. 8, two blades are skipped in each indexing movement. The line of grinding contact follows respectively along blades 1, 4, 7, 3, 6, 2, and 5 and the path of the free return movement is successively along lines $1^a$, $4^a$, $7^a$, $3^a$, $6^a$, $2^a$, and $5^a$ to the starting point.

In Fig. 9, ten blades are skipped in each indexing movement. The line of grinding contact follows successively along blades 1, 2, 3, 4, 5, 6, 7, 8, 9, and 10, and the path of the free return movement follows successively along lines $1^a$, $2^a$, $3^a$, $4^a$, $5^a$, $6^a$, $7^a$, $8^a$, $9^a$, and $10^a$.

In operation, the cutter 12 is mounted in position between the stocks 20 and 21, and is angularly adjusted as shown in Fig. 6 to cause each blade $12^a$ to contact with the grinding wheel 11 at a region between the horizontal planes through the axes of the grinding wheel and the cutter, so as to project the grinding wheel into the circle of revolution to generate a radial relief along line $f$—$g$. The cutter is then reciprocated back and forth across the grinding wheel 11, and is rotated continuously in one direction in timed relation to the reciprocation. During the reciprocatory movement in one direction, a blade is presented to the grinding wheel, the rotation of the cutter serving to compensate for the helix angle $x$, and during the reciprocatory movement in the other direction, the cutter is spaced from the grinding wheel, the rotation of the cutter serving to index another blade into the grinding stroke. In the indexing movement, at least one blade is skipped, and the number of blades that are skipped is such in relation to the total number, that all of the blades will be ground alike.

I claim as my invention:

1. The method of grinding cutters having a plurality of helical cutting edges which comprises reciprocating the cutter across a grinding element, separating the cutter from the grinding element at appropriate times, and imparting a rotary motion in one direction to the cutter in timed relation to the reciprocatory motion, this relation being such that during each separation one or more edges are skipped in passing from one edge to another edge.

2. The method of grinding cutters having $n$ helical cutting edges which comprises imparting a relative reciprocatory and rotary motion to said cutter and a grinding element, the grinding element being removed from the cutter being ground at appropriate times when passing from one edge to another, the rotary motion and reciprocatory motion being timed during removal of the grinding element to skip a number of edges and such a number that each edge will be ground after $n-1$ indexing movements.

3. The method of grinding cutters having helical cutting edges which comprises imparting a relative reciprocatory and rotary motion to said cutter and a grinding element, the grinding element being removed from the cutter being ground at appropriate times when passing from one edge to another, the rotary motion and reciprocatory motion being timed to skip a number of edges during each removal of the grinding element, the number of edges skipped being such that upon continued rotation of the cutter all of the edges will be ground equally.

4. The method of grinding cutters having a plurality of equally spaced peripherally overlapping helical cutting edges which comprises imparting a relative reciprocatory and rotary motion to said cutter and a grinding element, the grinding element being removed from the cutter at appropriate times when indexing from one edge to another, the rotary motion and reciprocatory motion being timed during removal of the grinding element to skip one or more edges in each indexing movement.

5. The method of relief grinding cutters having a plurality of equally spaced helical cutting edges which comprises reciprocating the cutter across a grinding element adapted to project into the circle of revolution of the cutter, separating the cutter being ground from the grinding element at appropriate times, and imparting a continuous rotary motion to the cutter in one direction and in timed relation to the reciprocatory motion, this relation being uniform for both directions of reciprocation and being such that during each separation one or more edges are skipped in passing from one edge to another edge.

6. The method of grinding cutters having a plurality of peripherally overlapping helical cutting edges which comprises reciprocating the cutter across a grinding element adapted to project into the circle of revolution of the cutter, one stroke of each reciprocation being a cutting stroke and the other stroke of each reciprocation being a free return stroke, and imparting a continuous rotary motion to the cutter in timed relation to the reciprocatory motion to compensate for the helix angle during the cutting engagement and to index past one edge to another edge during each separation between the cutter and the grinding element, the angle of the path generated during the separation being equal to the helix angle.

7. A machine for grinding rotary cutters having a plurality of helical cutting edges, comprising, in combination a grinding element adapted to project into the circle of revolution of the cutter, means for reciprocating the cutter across said grinding element, means for separating the cutter from the grinding element at appropriate times, and means for imparting a continuous rotary motion to the cutter in one direction and at a rate relative to the reciprocatory motion that at least one edge is skipped in passing from one edge to another during each separation.

8. A machine for grinding rotary cutters having a plurality of overlapping helical cutting edges comprising, in combination, a grinding element, means for relatively reciprocating the cutter across said grinding element alternately in a cutting stroke and a free return stroke, and means for imparting rotary motion to the cutter in one direction and at a rate relative to the reciprocatory motion during each free return stroke that at least one edge is skipped in indexing from one edge to another.

9. The method of grinding cutters having a plurality of helical cutting edges which comprises reciprocating the cutter relatively across a grinding element, separating the cutter and the grinding element at appropriate times, and imparting a continuous rotary movement in one direction to the cutter, the rotary movement being in timed relation to the reciprocatory motion during the cutting engagement to compensate for the inclination of the cutting edges, the rotary movement and the reciprocatory movement being related to the inclination and spacing of the edges to index past one edge to another edge during each period of separation.

10. The method of grinding rotary cutters having a plurality of peripheral cutting edges which comprises imparting a relative reciprocation between the cutter and a grinding element, each reciprocation comprising a cutting stroke and a free return stroke, and imparting an indexing movement to the cutter from the edge last ground past one edge to another edge during each return stroke.

11. The method of grinding rotary cutters having a plurality of peripherally spaced cutting edges which comprises imparting a relative reciprocatory motion to said cutter and a grinding element, separating the cutter and the grinding element at appropriate times, and imparting an indexing movement to the cutter from the edge last ground past one edge to another edge during each period of separation.

12. A machine for grinding rotary cutters having a plurality of longitudinal cutting edges comprising, in combination, a grinding element, means for relatively reciprocating the cutter across said grinding element alternately in a cutting stroke and a free return stroke, and means for imparting an indexing movement to the cutter during each free return stroke from the edge last ground past one edge to another edge.

13. A machine for grinding rotary cutters having a plurality of cutting edges comprising, in combination, a grinding element, means for relatively reciprocating the cutter across said grinding element and separating the cutter and said grinding element at appropriate times during said reciprocation, and means for imparting a relative indexing movement to the cutter from the edge last ground past one edge to another edge during each period of separation.

In testimony whereof, I have hereunto affixed my signature.

GERARD A. DE VLIEG.